July 14, 1936.  J. E. DAVIS  2,047,770
REENFORCED HOSE
Filed March 6, 1929

INVENTOR
Joseph E. Davis
BY
Marshall Hawley
ATTORNEYS

Patented July 14, 1936

2,047,770

UNITED STATES PATENT OFFICE 2,047,770

REENFORCED HOSE

Joseph E. Davis, Beacon, N. Y., assignor to New York Rubber Corporation, New York, N. Y., a corporation of New York Application March 6, 1929, Serial No. 344,651

19 Claims. (Cl. 138—56)

This invention relates to reenforced hose and particularly to hose designed for heavy and severe duty.

The invention has been particularly worked out in connection with a reenforced hose for use with high pressure water pumps as a conduit for conducting the water under high pressure to oil wells during the drilling operation.

At the present time, oil wells are being sunk deeper and deeper and in order to drill wells to such depths as 4,000 feet and over, it is necessary to pump the water into the wells at exceedingly high pressures. During the drilling operation the pressure pulsates back and forth, causing the hose to vibrate continuously.

It will be obvious that a hose in order to withstand such heavy and severe usage, must be so made that it will not give way under high pressures or under the vibration and shocks to which it is subjected. Furthermore, the hose must be flexible and should be so made that it will not stretch.

With the above difficulties and problems in mind, the invention has for its salient object to provide a reenforced hose so constructed as to withstand severe usage and heavy pressures and, moreover, having sufficient flexibility to be capable of bending or twisting without injury thereto.

Figure 1:
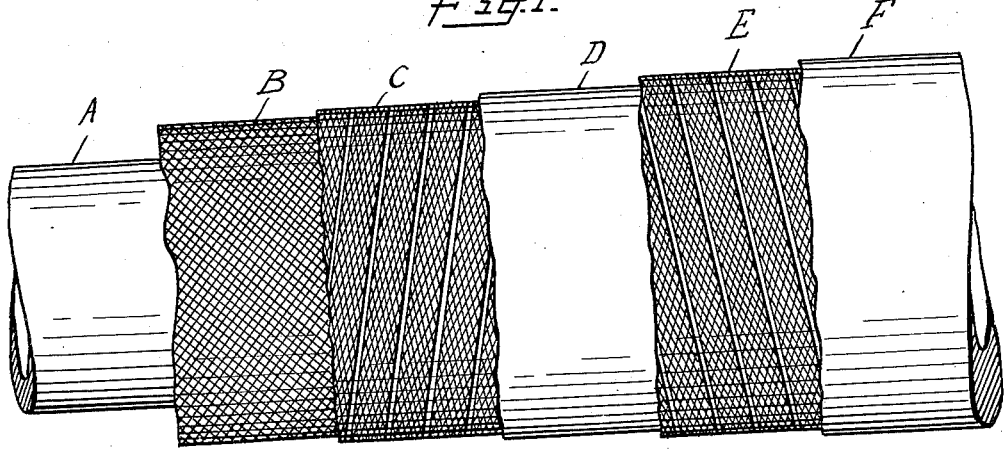
Figure 2:
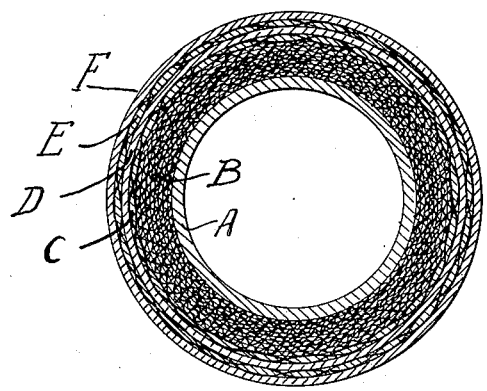

Further objects of the invention will appear from the following specification taken in connection with the drawing, which forms a part of this application, and in which Fig. 1 is an elevational view broken away to show the different sections or layers of the hose; and Fig. 2 is a transverse sectional elevation of the hose shown in Fig. 1.

The invention briefly described consists of a hose comprising a plurality of concentric layers of material intimately united to form a unitary structure. The body of the hose is formed of rubber or rubber-like material and is reenforced by one or more layers preferably formed of metallic reenforcing material. This material may consist of wire mesh or other metallic strip material or ribbon constructed and arranged for interlocking engagement with the body of the hose. The layers of reenforcing material are interlocked with the rubber-like body or have the interstices or openings therein filled with the rubber. The wire mesh or other metallic reenforcing material is preferably formed in strips and is wound tightly around the next adjacent layer in a spiral path, and in case two layers of material are used, one layer is wound in a spiral in one direction and the other layer is wound in a spiral in the opposite direction. When the hose has been built up in this manner, it is vulcanized under pressure, and the rubber will flow into the mesh of the adjacent layer or layers or will otherwise interlock therewith and will completely fill the interstices or openings therein.

Further details of the invention will appear from the following description.

In the particular form of the invention illustrated in the drawing, the hose comprises a plurality of layers A, B, C, D, E and F. The inner layer A is formed of rubber. Layer B is formed of a plurality of thicknesses of rubberized or frictioned duck. The next outer layer C is formed of a spiral winding of a strip of wire mesh, the wire preferably being of high temper and high tensile strength. The next outer layer D is formed of rubber and a second layer E of wire mesh surrounds the layer D of rubber.

Attention is called to the fact that the layer C is wound in a spiral in one direction and the layer E is spirally wound in the opposite direction. This is particularly advantageous since the wire mesh of the two layers will effectively cover all parts of the hose and any tendency of one of the spiral layers to unwind will be counteracted by the opposite winding of the other layer. The outer layer F is formed of rubber.

It has been found that the crossed windings of wire are essential to prevent undue stretching of the hose under the exceedingly high pressures encountered in mine drilling at great depths. The elongation experienced with hose with successive windings or layers of wire wound in the same direction has caused the hose to give way. This will be evident when it is borne in mind that the spaces between successive convolutions of a winding must increase in width as the hose elongates and that an elongation of twenty degrees for instance in length of the hose will cause an even greater percentage of increase in the widths of the spaces.

However, with the layers of windings crossed as illustrated and described, the amount of elongation is cut down to a safe limit and the crossed layers or winding prevent any lateral bursting of the hose.

It is also essential for the success of the hose that a slight spacing be permitted for successive or adjacent convolutions since flexibility or capability of bending is necessary. If the convolutions abut it is difficult to bend the hose and when bending is effected the abutting portions of the wire are distorted and displaced.

When the hose is made up in the manner above described, it is vulcanized under pressure, and the rubber in the layers D and F will flow into and completely fill the interstices in the mesh of the wire strips. This effectively counteracts any tendency of the wire strips to unwind and, furthermore, prevents the wire and adjacent parts from separating.

It will be obvious that the reenforcing layers C and E will counteract any tendency of the hose to stretch and the elasticity of the rubber and of the reenforcing layers will permit the hose to bend or twist but will return the hose to its original shape after the bending or twisting stresses have been removed. As many reenforcing layers can be used as is desirable and it is not the intention to limit the invention to any particular number of reenforcing layers.

Moreover, the invention is not limited to the use of wire mesh material, but is intended to include in its broader aspects the use of strips or ribbons of other metallic material constructed and arranged for interlocking engagement or intimate union with the rubber-like body of the hose.

Although the reenforced hose has been particularly described in connection with oil drilling operations, it should be understood that the invention is not limited to any such specific use but is capable of general application and the hose may be used wherever necessity requires a hose capable of withstanding severe usage.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A hose comprising a body of rubber-like material having embedded therein a plurality of separated spirally wound layers of mesh material, the convolutions of which are slightly spaced, one of the layers being wound in one direction and another layer being wound in the opposite direction.

2. A hose comprising a body of rubber-like material, and a plurality of reenforcing mesh strips embedded therein, said strip being of flexible material, the material on opposite sides of such strips being united through the spaces therebetween, said strips being wound in opposite directions to cross each other, and each strip having tions to cross each other, and each strip having slightly spaced adjacent convolutions constructed and arranged to permit bending of the hose without causing said adjacent convolutions to abut or overlap.

3. A hose comprising a body of rubber-like material and having a plurality of spirally wound layers, said layers being wound in opposite directions whereby the convolutions cross each other and at least one of said layers being formed of and being embedded in metallic mesh material and being embedded in the rubber-like material.

4. A hose comprising a body of rubber-like material, and a plurality of slightly spaced convolutions of reenforcing mesh strips embedded therein, said convolutions crossing and being of flexible material, the material on opposite sides of such mesh strips being united through the spaces therebetween.

5. A hose comprising a body of rubber-like material having embedded therein a plurality of separated spirally wound layers of metallic mesh material, said layers being wound in opposite directions to cross each other, and each layer having the adjacent convolutions slightly spaced to permit bending of the hose without causing said adjacent convolutions to abut or overlap.

6. A hose comprising a body of rubber-like material having embedded therein a plurality of layers of foraminous metallic reenforcing material, said layers being wound in opposite directions to cross each other, and each layer having adjacent convolutions spaced apart to permit bending of the hose without causing said convolutions to abut or overlap.

7. A hose comprising a body of rubber-like material and a plurality of reenforcing mesh strips embedded therein, said strips being of flexible material, the material on opposite sides of such strips being united through the spaces therebetween and through the openings in said mesh, said strips being wound in opposite directions to cross each other, and each layer having slightly spaced adjacent convolutions to permit bending of the hose without causing said convolutions to abut or overlap.

8. A hose comprising a body of rubber-like material having imbedded therein a plurality of separated spirally wound layers of metallic mesh material, one of the layers being wound in one direction and another layer being wound in the opposite direction.

9. A hose of the character described, including a tubular wall structure having therein a plurality of rubber saturated flat metal fabric ribbons wound one outside the other in opposite hand helices.

10. A hose of the character described, including a rubberized tubular wall structure having a plurality of rubber saturated flat metal fabric ribbons wound one outside the other in opposite hand helices, the rubber of said ribbons being combined with the rubber of said tubular wall structure into a homogeneous rubber structure during curing of the hose.

11. A hose of the character described, including: an inner tubular rubber wall; an intermediate cloth fabric wall surrounding said inner wall; crossing helices of flat rubberized metallic fabric ribbon wound on said cloth fabric; and an outer layer of rubber covering the previously set forth structure, the rubber of the various layers being amalgamated into a homogeneous rubber structure when cured after placement of the layers in their relative positions.

12. A hose comprising an inner tube of rubber, a tube of woven fibrous material surrounding said rubber tube, a tube formed of spirally wound wire braid forming a substantially continuous covering over said tube of fibrous material and in such relation thereto as to afford it a supporting pressure before any inner layer is stretched radially to its elastic limit, and a second tube formed of wire braid wound on a spiral which is oppositely inclined from the first named spiral of wire braid with respect to a plane perpendicular to the axis of the tube and which is in such relation to the layer within it and is so positioned in the body of the hose as to exert a supporting pressure thereagainst before any inner layer is stretched radially to its elastic limit.

13. A hose as defined in claim 12 in which the threads of the woven material and the wires of the spiral braid are embedded in a matrix of vulcanized rubber.

14. A hose of the character described, including a tubular wall structure comprising rubber-like material and having therein a plurality of metallic ribbons wound one outside the other in opposite hand helices, at least one of said ribbons having openings therethrough to promote interlocking engagement of the ribbon and the wall structure.

15. A hose of the character described, including a tubular wall structure comprising rubber-like material and having therein a plurality of metallic ribbons wound one outside the other in opposite hand helices, at least one of said ribbons being formed for interlocking engagement with the wall structure.

16. A hose of the character described, including a tubular wall structure comprising rubber-like material and having therein a plurality of metallic ribbons wound one outside the other in opposite hand helices, at least one of said ribbons being formed for interlocking engagement with the wall structure, and the adjacent convolutions of each ribbon being slightly spaced to permit bending of the hose without causing said convolutions to interfere with each other.

17. A hose of the character described, including a tubular wall structure of rubber-like material and having therein a plurality of metallic reenforcing windings, wound one outside the other in opposite hand helices, at least one of said windings having openings therethrough to promote interlocking engagement of the winding and wall structure.

18. A hose of the character described, including a tubular wall structure of rubber-like material and having therein a plurality of metallic reenforcing windings wound one outside the other in opposite hand helices, at least one of said windings being formed for interlocking engagement with the wall structure, and the adjacent convolutions of each winding being slightly spaced to permit bending of the hose without causing said convolutions to interfere with each other.

19. A hose of the character described, including a tubular wall structure comprising rubber-like material and having therein a plurality of reenforcing metallic ribbons wound one outside the other in opposite hand helices and intimately united with the rubber-like material.

JOSEPH E. DAVIS.